(12) United States Patent
Kelley et al.

(10) Patent No.: US 6,722,078 B1
(45) Date of Patent: Apr. 20, 2004

(54) FISHING JIGGER

(76) Inventors: Richard Kelley, 504 E. Marlet, New Sharon, IA (US) 50207-9757; Rick Talbert, P.O. Box 636, Montezuna, IA (US) 50171

( * ) Notice: Subject to any disclaimer, the term of this patent is extended or adjusted under 35 U.S.C. 154(b) by 0 days.

(21) Appl. No.: 10/114,364

(22) Filed: Apr. 2, 2002

(51) Int. Cl.$^7$ .......................... A01K 87/00; A01K 97/11
(52) U.S. Cl. ............................................ 43/19.2; 43/15
(58) Field of Search ............................ 43/15–17, 19.2, 43/26.1

(56) References Cited

U.S. PATENT DOCUMENTS

| | | | |
|---|---|---|---|
| 2,861,378 A | * | 11/1958 | Bell .......................... 43/19.2 |
| 2,992,504 A | * | 7/1961 | Cape ........................ 43/19.2 |
| 3,691,668 A | * | 9/1972 | Strebig ..................... 43/19.2 |
| 3,813,807 A | * | 6/1974 | Ruppa ........................ 43/15 |
| 4,020,582 A | * | 5/1977 | Thelen ..................... 43/19.2 |
| 4,033,062 A | * | 7/1977 | Denecky ...................... 43/15 |
| 4,420,900 A | | 12/1983 | Nestor |
| 4,581,840 A | | 4/1986 | Guith |
| 4,597,215 A | | 7/1986 | Otremba |
| 4,951,411 A | | 8/1990 | Ecker |
| 5,321,377 A | * | 6/1994 | Aharonian ................... 335/78 |
| D363,970 S | | 11/1995 | Cutshaw |
| 5,483,768 A | * | 1/1996 | Tessier ........................ 43/16 |
| 5,570,534 A | * | 11/1996 | Ford .......................... 43/19.2 |
| 6,009,656 A | | 1/2000 | Knepp |
| 6,021,596 A | | 2/2000 | Heuke |
| 6,415,543 B2 | * | 7/2002 | Keller ........................ 43/19.2 |

* cited by examiner

Primary Examiner—Michael J. Carone
Assistant Examiner—James S. Bergin
(74) Attorney, Agent, or Firm—Daniel A. Rosenberg; Kent A. Herink; Davis, Brown, Koehn, Shors & Roberts, P.C

(57) ABSTRACT

An automated fishing line jigger, comprising a rotatable member adapted for rotation-such that fishing line associated with the rotatable member is jigged as the rotatable member rotates. An electromagnet operatively connected to the rotatable member, the rotatable member having a first position and a second position such that in the first position the electromagnet is energized causing rotation in a first direction and in the second position gravity causes rotation in a second direction opposite the first direction.

9 Claims, 8 Drawing Sheets

FISHING JIGGER

BACKGROUND OF THE INVENTION

Field of the Invention

This invention relates to a device for producing oscillatory motion. More specifically, and without limitation, this invention relates to providing oscillatory motion to a fishing line in an automatic fishing jigger.

Fishing jiggers and related devices provide oscillatory motion to fishing lines. Conventionally, such motion is imparted by the fisherperson raising and lowering the tip of the rod to cause motion that attracts fish to the bait or lure on a fishing line. The motion of the bait or lure makes the bait or lure appear more life like and/or otherwise attracts the attention of fish. Manually providing this motion is problematic. First, manually moving the fishing line can become tiring. This is particularly true in ice fishing, the cold environmental conditions causing manual jigging to be more burdensome. Further, there are other problems with manually jigging a fishing line. For example, a fisherperson may wish to use multiple fishing lines at the same time to improve the likelihood of catching more fish. Jigging multiple lines at the same time then become impractical if not impossible for a single person.

Further, elderly people, physically disabled individuals, and small children have difficulties jigging fishing lines, especially for long periods of time.

Various attempts have been made to create automatic fishing jiggers. For example, U.S. Pat. No. 4,951,411 to Ecker discloses an electrically operated fishing jigger. The Ecker device uses rotation of a cam to provide oscillatory movement to the fishing line. Other attempts have used different configurations of electric motors to create this motion. Such attempts include U.S. Pat. No. 4,420,900 to Nestor; U.S. Pat. No. 4,597,215 to Otremba; U.S. Pat. No. 5,570,534 to Ford; and U.S. Pat. No. 6,009,656 to Knepp. In addition, other attempts have been made at automatic fishing jiggers. For example, U.S. Pat. No. 6,021,596 to Heuke uses a wind driven method instead of an electrical system and U.S. Pat. No. 4,581,840 to Guith uses a foot pedal to provide movement.

A further problem with automatic fishing jiggers is that the effect of a strike by fish on the bait or lure is not taken into account. Once a fish bites, there is a need to set the hook. If the hook is set manually by a fisherperson, then the fisherperson must be able to access the fishing rod and set the hook. This can be problematic in some prior art attempts at fishing jiggers where the fishing rod is not easily accessible.

Despite these and other attempts at providing an automatic fishing jigger, problems remain.

It is therefore a primary object of the present invention to improve upon the state of the art.

It is a further object of the present invention to provide a device for producing oscillatory motion.

Yet another object of the present invention is to provide a device for producing oscillatory motion that is appropriate for jigging a fishing line.

Yet another object of the present invention is to provide a fishing device that provides for jigging as well as setting a hook.

A further object of the present invention is to provide a fishing device that is versatile enough to be used for either ice fishing, be mounted on a boat, or other use.

These and other objects, features, or advantages of the present invention will become apparent from the description and claims.

BRIEF SUMMARY OF THE INVENTION

The present invention is a device for producing oscillatory motion. In particular, the present invention provides for, but is not limited to, providing oscillatory motion to a fishing line.

The invention includes an electromagnetic device having a conductor operatively wound around a structure. A mass is disposed within the structure such that energizing the electromagnetic device moves the mass in a first direction. A rotatable member can be connected to the electromagnetic device such that the weight of the mass causes the rotatable member to rotate. A fishing rod holder is then operatively connected to the rotatable member such that the fishing rod holder and any attached fishing rod is also moved.

The electromagnetic device of the present invention and its mass can be configured in various ways to impart oscillatory motion.

In one embodiment of the present invention of automatic fishing jigger has a fishing rod holder. A moveable structure is operatively connected to the fishing rod holder and an electromagnet is operatively connected to the movable structure for imparting movement to the movable structure. The movable structure has at least a first jigging position and a second jigging position. The movable structure being such that the movable structure in the second jigging is above or upward of the movable structure when the fishing jigger is in the first jigging position. The automatic fishing jigger can be mounted on a base, the movable structure movably connected to the base. In addition, the automatic fishing jigger can include an arm operatively connected to the base. Further, the automatic fishing jigger can include an adjustable weight operatively connected to the arm. The automatic fishing jigger can include a latch operatively connected to the arm such that when a fish strikes, the latch is unlatched to set the hook.

The present invention also includes a jointed fishing rod that can be used with the fishing jigger.

BRIEF DESCRIPTION OF EXEMPLARY DRAWINGS

DETAILED DESCRIPTION OF THE INVENTION

A preferred embodiment of the present invention is set forth. It should be appreciated, however, that the present invention contemplates numerous variations, embodiments, and applications and is not to be limited to those specifically disclosed herein. The present invention is not limited to a fishing jigger or the specific embodiment of a fishing jigger disclosed herein.

Figure 1A:
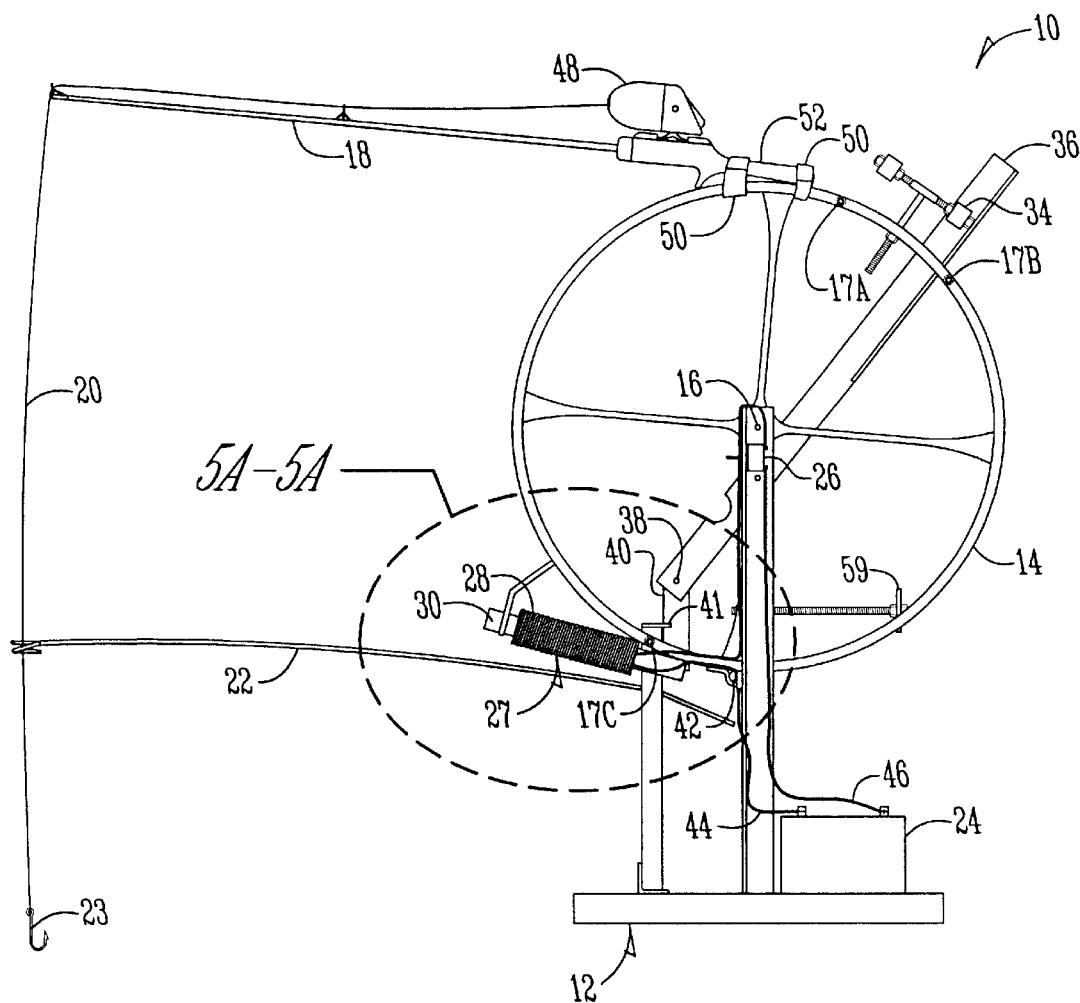
FIG. 1A is a front view of an automatic fishing jigger according to the present invention in a first position.

FIG. 1A discloses a front view of a fishing jigger 10 of the present invention in a first position. The fishing jigger 10 includes a base 12. A rotatable member 14 such as a wheel is rotatably mounted on the base 12 at a pivot 16. Mounted on the rotatable member 14 are a series of stops 17A, 17B, and 17C.

A fishing rod 18 is also operatively connected to the rotatable member 14. A fishing line 20 extends downward from the fishing rod 18 through a guide 22. A hook 23 with bait or a lure is connected to the fishing line 20.

As the rotatable member 14 rotates, the fishing line 20 and attached hook 23 is jigged. Movement of the rotatable member 14 in a back and forth fashion thereby provides oscillating movement to jig the line 20.

To create this oscillating motion, a battery 24 or other power source is electrically connected through a switch 26 to an electromagnetic device 27. The present invention can use any number of power sources. One convenient power source is a car battery or a battery used with a trolling motor. The electromagnetic device includes a conductor 28 coiled or wrapped around a structure 30 such as a tube.

Figure 5A:
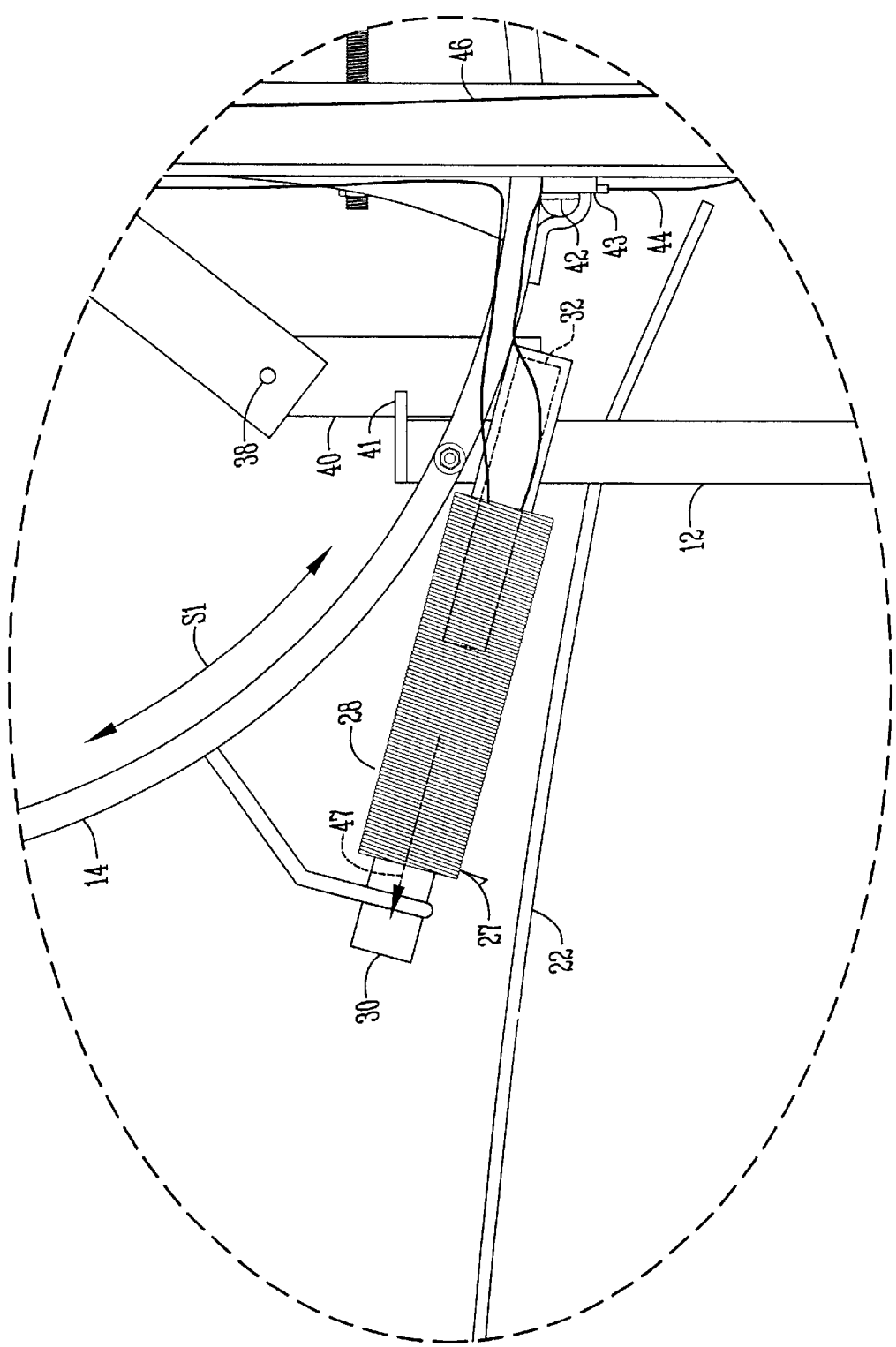
FIG. 5A is a detailed view of the electromagnetic device of the present invention when in a first position.

Referring now to FIG. 5A, the electromagnetic device is shown in greater detail. Within the electromagnetic device 27, there is a mass 32 within the structure 30. The structure 30 being a tube, pipe or other structure that a conductor 28 can be wrapped around to create an electromagnet. Although preferably the structure 30 is cylindrical such as a PVC pipe, the present invention is not limited to any specific shape. A contact 42 is provided on the rotatable member 14. When the rotatable member rotates sufficiently, the contact 42 is in operative connection with a contact 43. When contacts 42 and 43 are connected, the electromagnet created by the conductor 28 is energized. The resulting electromagnet force imparts movement to the mass 32 within the structure 30, moving in a direction indicated by arrow 47.

Figure 5B:
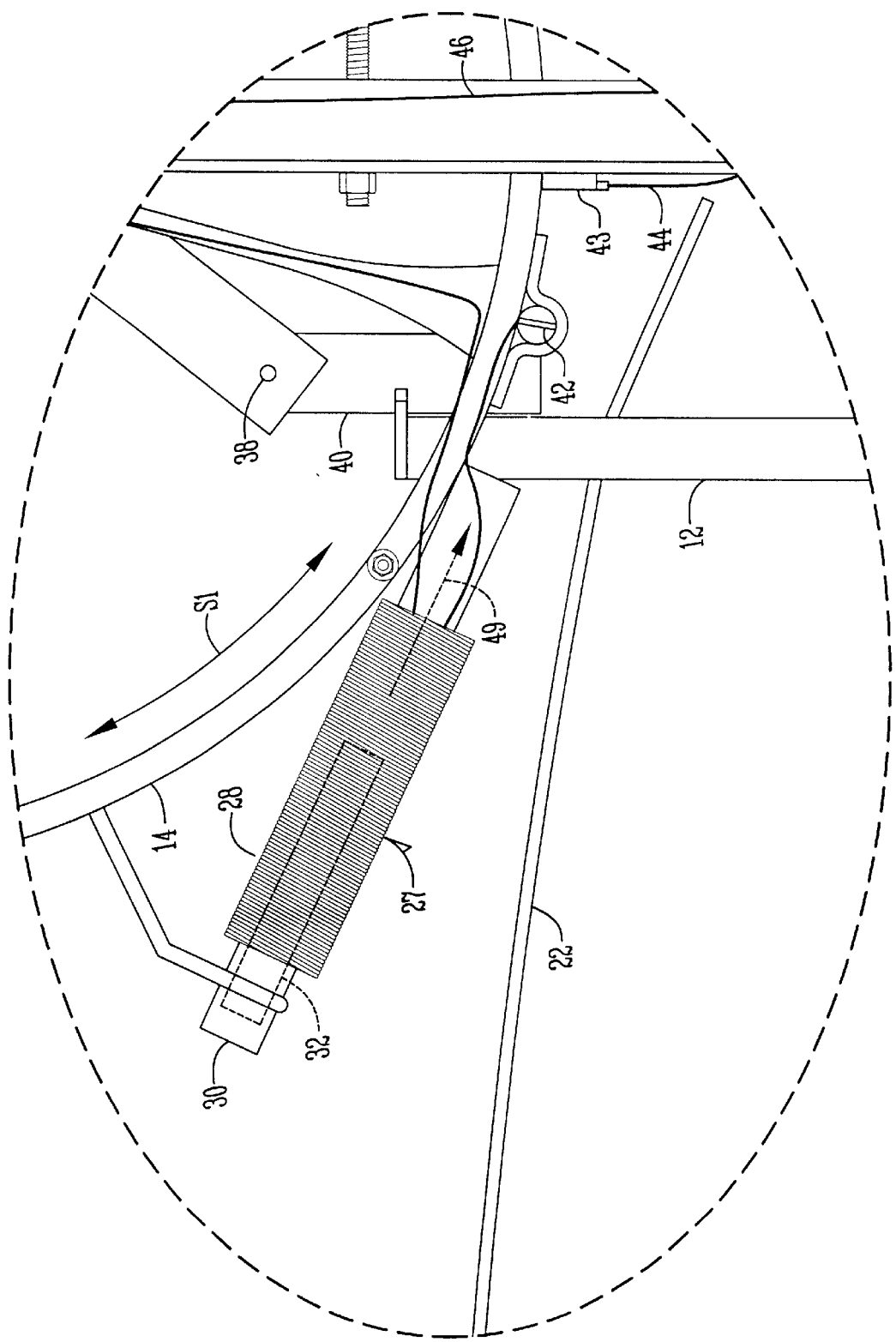
FIG. 5B is a view of the electromagnetic device of the present invention when in a second position.

Referring now to FIG. 5B, the mass 32 is now located on the opposite end of the structure 30. This force also moves the rotatable member 14 accordingly as the rotatable member 14 is operatively connected to the structure 30 in which the mass 32 is located. Gravitational forces acting on the mass 32 then move the mass 32 within the structure 30 in a direction indicated by arrow 49. This results in the rotatable member being rotated back towards the contact 43. When the rotation is sufficient that contact 42 and 43 come in contact, the electromagnet is energized again.

This interaction between the electromagnetic force on the mass 32 creates motion in one direction while the gravitational force on the mass 32 creates motion in the opposite direction. Thus, in this manner, the present invention provides for oscillatory movement. In the present preferred embodiment of an automatic fishing jig, this oscillatory movement imparts movement to a fishing rod 18 mounted on the rotatable member 14.

Figure 1B:
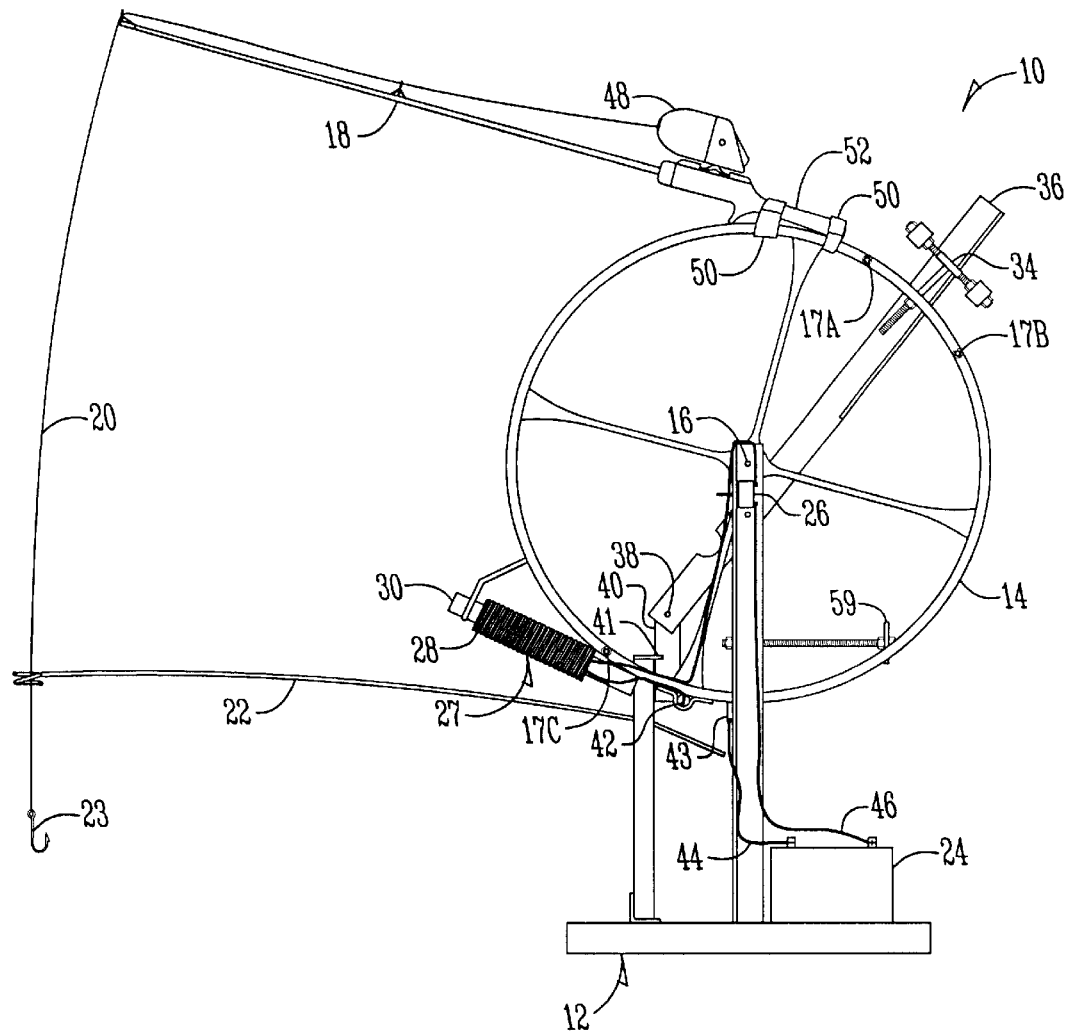
FIG. 1B is a front view of an automatic fishing jigger according to the present invention in a second position.

Returning to FIGS. 1A and 1B, a fishing rod 18 and reel 48 are shown in a first position in FIG. 1A and a second position in FIG. 1B. In the second position, the rod 18, reel 48 and line 20 are positioned upward or above the rod 18, reel 48 and line 20 of the first position. The fishing rod 18 is attached to the rotatable member 14 using a fishing rod holder, such as one or more straps 50. Using velcro™ straps 50 allows the fishing rod 18 to be easily placed on the rotatable member 14 or removed from the rotatable member 14. The present invention, however, contemplates that any number of types of fishing rod holders can be used, such that the fishing rod 18 can snap into place or otherwise be releasably secured.

Figure 2:
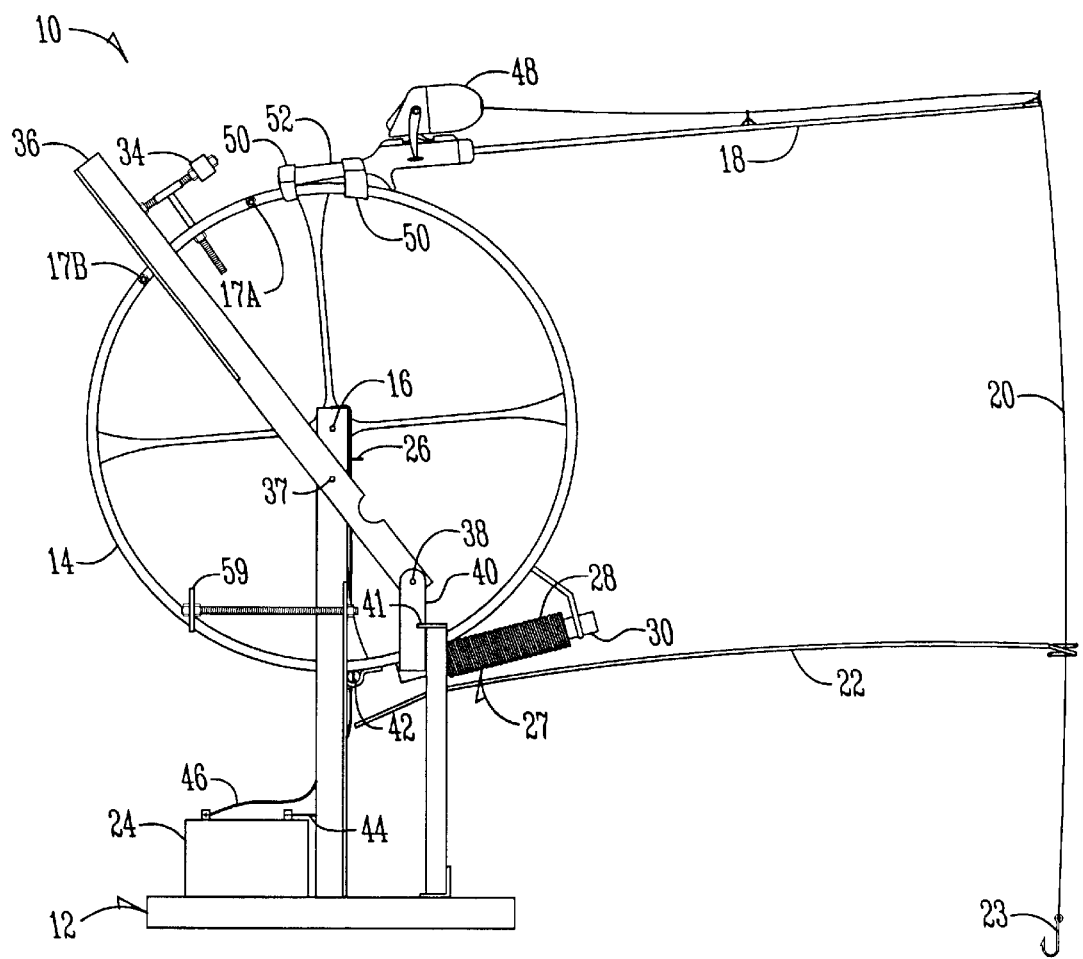
FIG. 2 is a rear view of a fishing jigger according to the present invention corresponding to FIG. 1A.

Referring to FIG. 2, a rear view of the automatic fishing jigger 10 is shown. An arm 36 is pivotally attached at pivot 37 to the base 12. A latch mechanism 40 is pivotally connected to the arm 36 at pivot 38. The latch 40 is releasably attached to a catch 41. When sufficient downward force is applied to the line 20, such as occurs when a fish strikes, the rotatable member 14 is rotated accordingly with enough force that the latch 40 is released from the catch 41. Once this occurs, the adjustable mass 34 and arm 36 swing downward as this weight is no longer being supported at the latch 40 and catch 41 connection.

Figure 3:
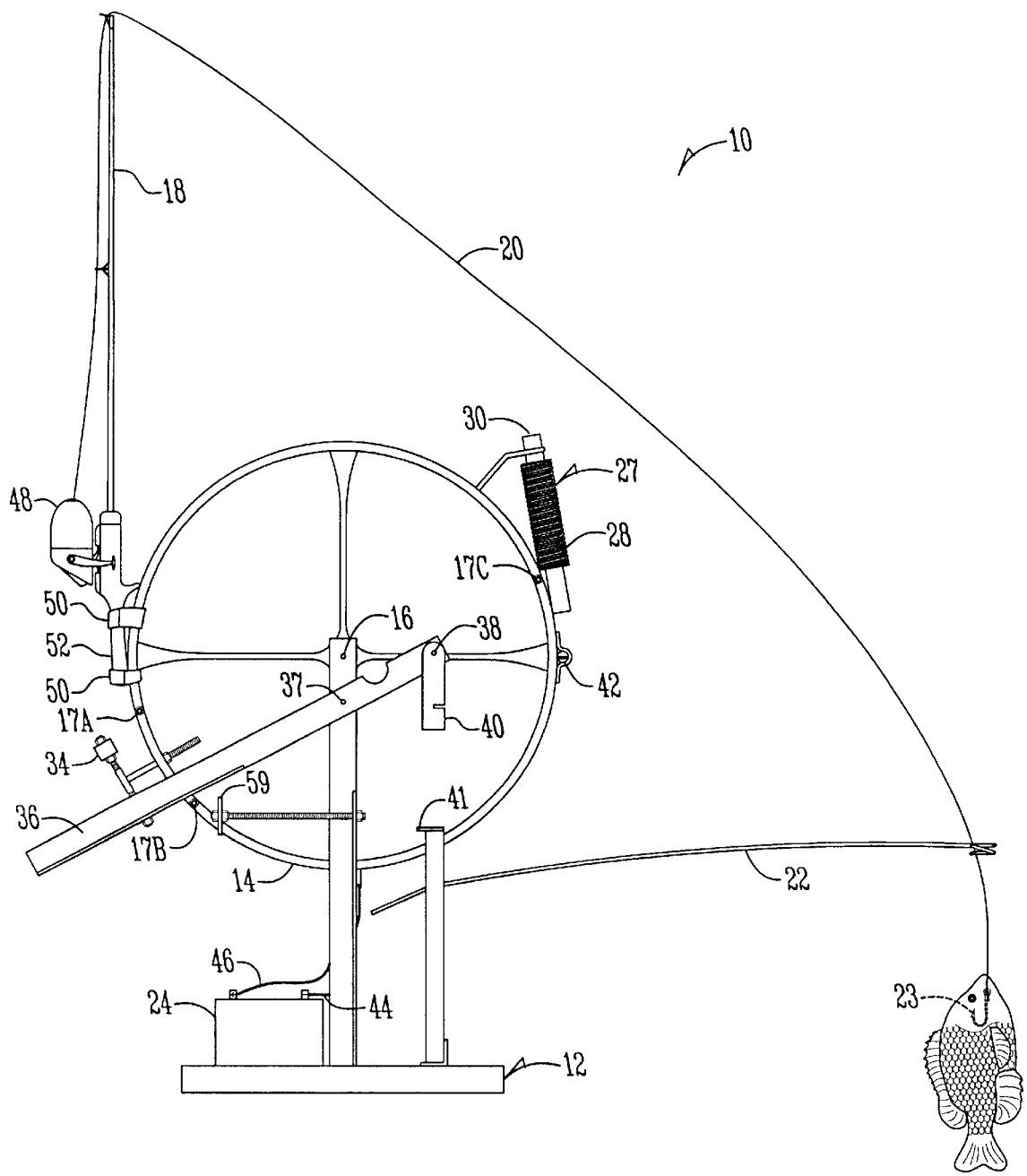
FIG. 3 is a rear view of an automatic fishing jigger according to the present invention in a hook setting position.
Figure 4:
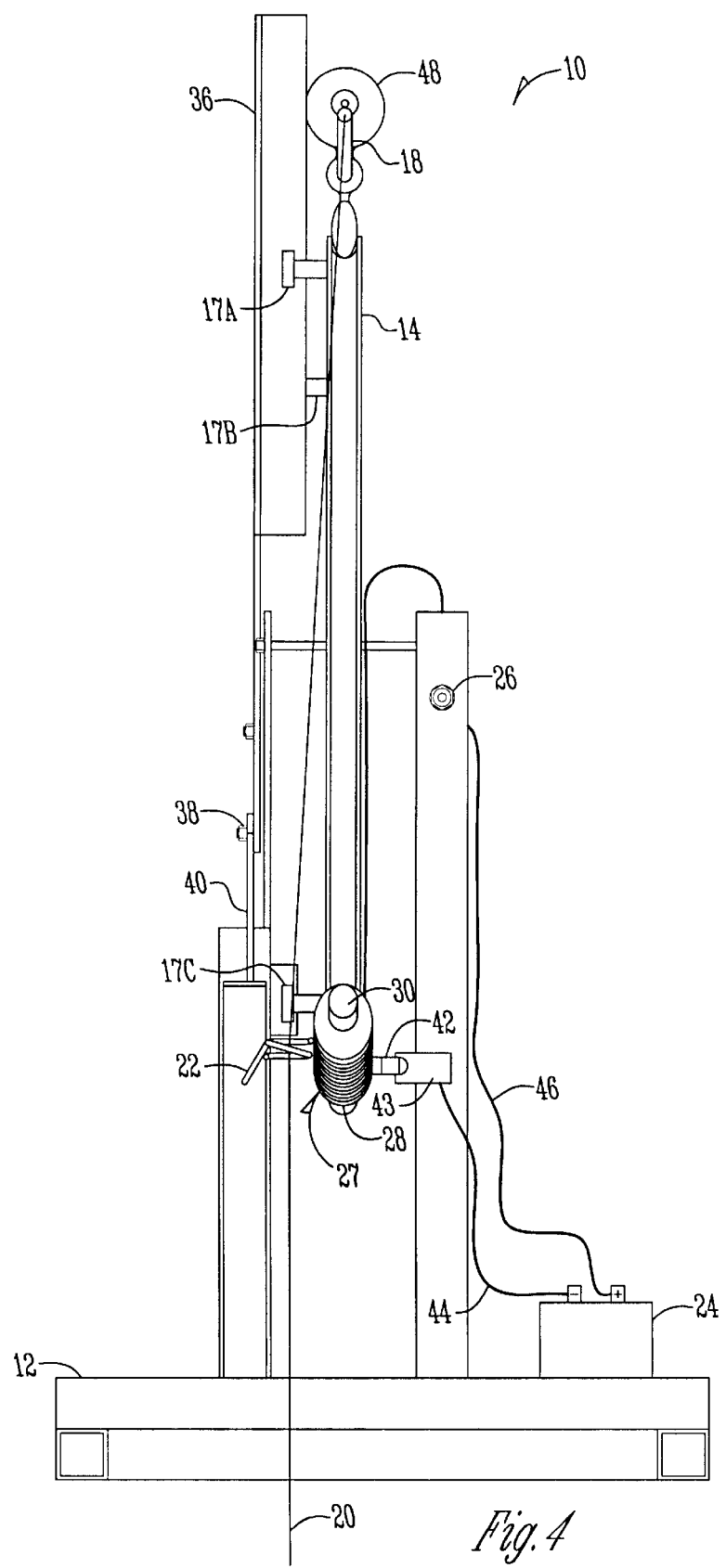
FIG. 4 is a side view of the present invention.

FIG. 3 shows the automatic fishing jigger 10 of the present invention in the hook setting position. As the fishing jigger 10 transitions from one of the jigging positions to the hook setting position, the fishing line 20 and connected hook 23 are pulled upward with force. This upward movement is preferably sufficient to result in setting the hook 23 in a fish (not numbered). When the latch 40 releases from the catch 41, the arm 36 with operatively connected weight 34 is thrust downward by the force of gravity. This rotates the rotatable member 14, the connected rod 18 and fishing line 20. The fishing rod 18 can then be removed from the straps 50 so that a fisherperson can reel in the fish. The downward force applied to the fish must be sufficient to rotate the rotatable member 14 such that the stop 17A hits the arm 36 hard enough to dislatch the latch 40 from the catch 41. FIG. 4 shows how the stop 17A is brought in contact with the arm 36. In a normal oscillating position, the arm 36 rotates with the rotatable member 14 but without extending past the stop 17A or the stop 17B. When the arm 36 swings downward in a hook setting position, it can swing no further downward than when the stop 17B contacts the stop 59.

Figure 6:
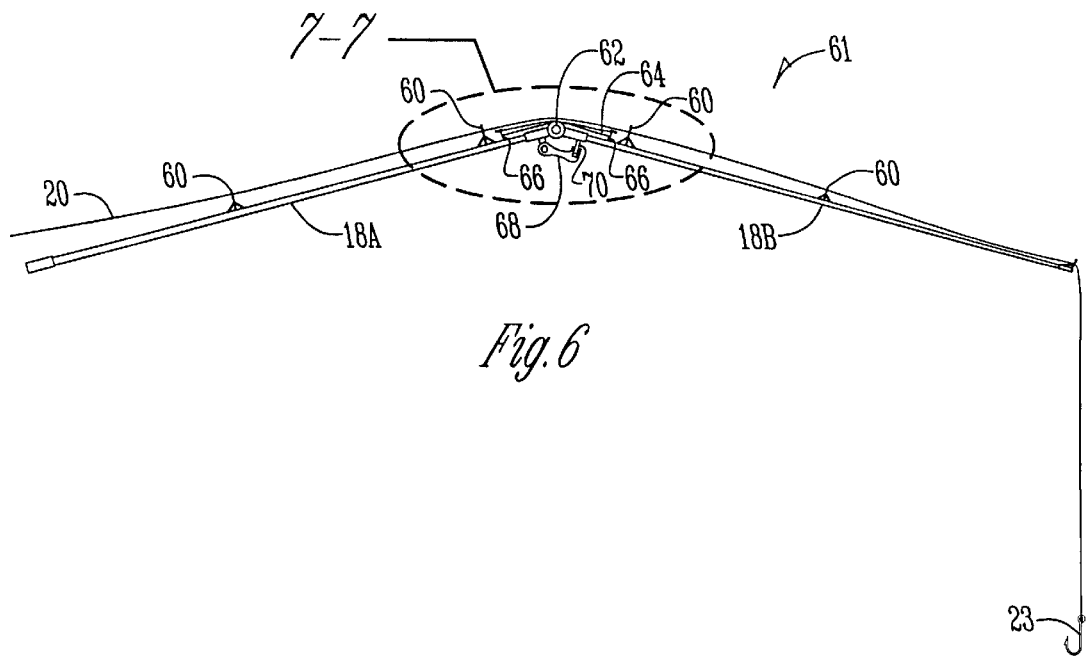
FIG. 6 is a front view of a jointed fishing rod according to the present invention.
Figure 7:
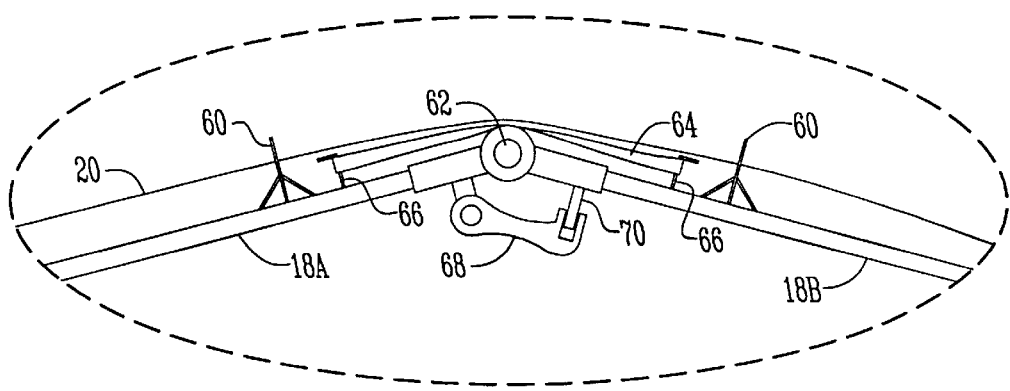
FIG. 7 is a detailed view of a jointed fishing rod according to the present invention.

FIGS. 6 and 7 illustrate a jointed fishing rod 61 that can be used according to the present invention. The jointed fishing rod 61 includes a first rod portion 18A and a second rod portion 18B connected at a joint 62. FIG. 7 shows those details of FIG. 6 cut away at line 7—7. In FIG. 7, a band 64, such as a rubberband, is connected between band supports 66. In addition, the first rod portion 18A is connected to rod portion 18B at the joint 62, as well as with a latch 68 that is releasably connected to a catch 70. The band 64 provides tension between the first rod portion 18A and the second rod portion 18B. When a sufficient downward force is applied to the rod portion 18B, such as when a fish strikes, the latch 68 is released from the catch 70 and the tension of the band 64 causes the rod portion 18B and accompanying line 20 and hook 23 to snap upward, thus setting the hook 23. The fishing rod shown in FIGS. 6 and 7 may be used with the fishing device of the present invention or may otherwise be used to set a hook.

The present invention contemplates numerous variations. For example, the adjustable weight of the fishing jigger 10 of the present invention can take on other forms or physical configurations. Preferably, the weight is adjustable in the most convenient manner possible. For example, the adjustable weight could be configured such as merely screwing a screw allows the weight to be adjusted. Another variation contemplated by the present invention is that a mercury switch can be used to switch the automatic jigger 10 off and on. For example, a mercury switch can be mounted on the rotatable member 14 or on the arm 36 such that when the fishing jigger 10 is in a hook setting position, the automatic jigger is turned off.

The present invention contemplates that the structure of the base 12 as shown is convenient for ice fishing. However, the present invention contemplates other such physical configurations can be used. For example, a different configuration can be used if the automatic fishing jigger 10 is to be mounted on a watercraft such as a boat.

The present invention also contemplates that the automatic fishing jigger 10 need not include a wheel 14. Instead, the electromagnetic device 27 can be configured to slide upward and downward on a plane with either the fishing line 20 or the fishing rod 18 attached or otherwise operatively connected to the electromagnetic device 27.

The present invention contemplates variations in the power source use. A battery 24 is shown such as a car battery. The present invention contemplates that other types of power sources may be used. For example, the battery for a trolling motor is one way to power the fishing jigger 10.

The present invention further contemplates that the guide 22 of the present invention can allow fishing line to be strung through an eyelet or else can be of a wrap around configuration so that the line 20 need not be threaded through the guide 22.

The present invention contemplates other variations in the particular configuration used, the specific application used, and other such variations as may be apparent to one skilled in the art.

What is claimed is:

1. An automated fishing line jigger apparatus, comprising:

a base member for supporting said apparatus;

at least one stay with a first end attached to the base member, and a second end opposite thereto;

a wheel rotateably secured to the second end of the stay;

an electromagnetic switch operatively connected to the wheel for rotating the wheel between a first position and a second position;

a power source operatively connected to the electromagnetic switch for providing operational power to the switch;

a fishing rod holder secured to the wheel; and a fishing rod releasable secured to the fishing rod holder wherein the fishing rod is jigged as the wheel rotates between the first and second positions under the power of the electromagnetic switch.

2. The invention in accordance with claim 1 further comprising two stops secured to the wheel to define the limits of movement between the first and second positions.

3. The invention in accordance with claim 2 further comprising an arm rotateable secured to the second end of the stay and to the wheel wherein the arm moves between the stops when the wheel moves between the first and second positions.

4. The invention in accordance with claim 1 further comprising an arm rotateable secured to the second end of the stay and to the wheel the arm having a counter weight to bias the arm in a direction opposite to that of a strike on the fishing pole, and a latch secured to the arm wherein the strike releases the latch sand allows the arm to set a hook.

5. The invention in accordance with claim 1 wherein the electromagnetic switch further comprise a coil wrapped around a rod and a switch whereby when the switch is closed the wheel is rotated from the first position to the second position.

6. The invention in accordance with claim 5 wherein the electromagnetic switch further comprises a weight that moves freely within the rod, such that when the wheel moves to the second position the weight moves into a position to bias the wheel to return to the first position.

7. The invention in accordance with claim 1 further comprising two stays.

8. The invention in accordance with claim 1 wherein the fishing rod is a jointed fishing rod.

9. The invention in accordance with claim 8 wherein the fishing rod is a jointed and latched fishing rod.

* * * * *